United States Patent [19]

Kim

[11] Patent Number: 4,563,933

[45] Date of Patent: Jan. 14, 1986

[54] DYNAMICALLY ILLUMINATED GUITAR

[76] Inventor: Chung C. Kim, 331 S. Harvard Blvd., Los Angeles, Calif. 90020

[21] Appl. No.: 575,432

[22] PCT Filed: Jun. 30, 1982

[86] PCT No.: PCT/US82/00883

§ 371 Date: Jan. 26, 1984

§ 102(e) Date: Jan. 26, 1984

[51] Int. Cl.[4] .................... G09B 15/02; G10D 1/08

[52] U.S. Cl. .................... 84/267; 84/464 A; 84/477 R

[58] Field of Search .................... 84/267, 464 R, 464 A, 84/477 R

[56] References Cited

U.S. PATENT DOCUMENTS 4,236,191 11/1980 Martinez .................... 84/464 A X

*Primary Examiner*—S. J. Witkowski

*Attorney, Agent, or Firm*—Albert O. Cota

[57] ABSTRACT

A dynamically illuminated guitar (10) for producing visual and sequential lighting effects on the guitar body (20) caused by spontaneous or deliberate hand and body movements of the guitarist and by external light sources. A plurality of light-emitting diodes (30) through (93) embedded into the guitar face and arranged in aesthetically pleasing designs serve as the display medium. A variety of different light display modes is selected by changing the orientation of the guitar (20) to cause a group of mercury tilt switches (120), (130), (140) to control the digital pulse format of an electronic pulse-forming circuit. Light-dependent resistors (160), (170) embedded on the guitar face further cause the guitar visual lighting display to be controlled by external variable lighting.

9 Claims, 6 Drawing Figures

DYNAMICALLY ILLUMINATED GUITAR

TECHNICAL FIELD

The invention pertains to illuminated guitars and especially to guitars whose illumination is produced dynamically by combinations of the guitarist's hand and body movements, background lights, singing and sounds produced by conventional strumming of the guitar.

BACKGROUND ART

It is well known in the art of modern guitar playing to provide background visual effects that pleasingly enhance the performance of the guitarist. When these visual effects are further incorporated into the instrument itself, an additive pleasure is often experienced by the audience.

Advancements in electronics, including development of new devices and higher parts density due to miniaturization have allowed visual illumination effects to be incorporated into modern guitar construction.

Arrays of colored light sources, masked and hidden within the guitar body produce light rays that impinge upon plastic walls of the guitar body to further produce a diffused uniform field of varying colored light.

In other embodiments, fiber optic strands are employed to transmit light from a source hidden within a guitar body to external locations on the guitar, thus allowing it to be played in the dark and to further produce a pleasing aesthetic effect.

Guitar music has been converted into visual illumination effects in some guitar embodiments by the employment of hidden dynamic microphones that convert audio tones into electrical control pulses that further modulate the light sources embedded in the guitar body. In another embodiment, the strumming of the guitar strings produces electrical continuity between a guitar string and a fret, causing a light source or array to be intermittently illuminated in concert with the music tones.

These embodiments lend visual effect to the performance of the guitarist. Their effect is controlled by the overt action of the guitarist making a conscious effort to activate switch mechanisms. It would seem to be novel and desirable to further achieve visual illumination effects while the guitarist is performing his or her natural spontaneous motions.

The prior art searched did not disclose any patents or publications that were directly related to a dynamically illuminated guitar of the type disclosed herein. However, the following U.S. patents were considered in the investigation and evaluation of the prior.art relative to the existing apparatus used with the invention.

| U.S. Pat. No. | INVENTOR | ISSUED |
|---|---|---|
| 3,958,113 | Termohlen | 18 May 1976 |
| 3,943,815 | Gilbert | 16 March 1976 |
| 3,854,370 | Sapinski | 17 December 1974 |
| 3,403,581 | Weitzner | 1 October 1968 |
| 3,324,755 | Canonico | 13 June 1967 |

The Termohlen patent described a masked light emitting means for generating a solid field of uniform colored light which glows and changes hue with variations in tone frequency as the guitar is played. The Gilbert patent describes a guitar containing fiber optic strands extending through the neck to conduct light from a source located in the body to fret markers on the fretted surface of the neck and the side surface. The Sapinski patent describes a training aid for a stringed musical instrument employing a light-transmitting substrate. The Weitzner patent comprises apparatus for displaying and cuing music in connection with a manually played string instrument in which playing of the instrument is coordinated with the display. The Canonico patent describes a guitar in which lamps illuminating transparent parts of the guitar are disposed inside the hollow body of the guitar and controlled by switches outside the guitar.

DISCLOSURE OF INVENTION

The dynamically illuminated guitar described herein comprises a standard guitar containing a multiplicity of small light sources arranged in an aesthetic design on the guitar face, typically of various colors around the perimeter of the guitar, and mounted flush with the guitar surfaces. Associated with the light sources is electronic circuitry hidden within the guitar body and disposed to cause successive illumination of the light sources such that only one lamp is illuminated at a time. Further associated with the light sources and electronic circuitry are a plurality of small mercury tilt switches and light-dependent resistors, embedded in strategic orientations on the guitar body. Also associated with the light sources and mounted on the guitar body are electro-mechanical switches, a phonojack receptacle and a dynamic pick-up microphone. Hidden within the guitar body is an electric battery of sufficient energy to power the electronic circuitry and light sources during performances by the guitarist.

The invention as herein described is capable of various modes of operation, these modes being complementary and capable of being switched into and out of operation during a guitar performance. The modes are described as follows:

(a) a circular and sequential lighting of the lamps is accomplished at an average switching rate that is pleasing to view. The switching rate is further modulated by the amplified sound tones picked up by the microphone.

(b) circular and sequential lighting modulated by varying background lighting and by the hand movements of the guitarist rather than by amplified sound tones, (c) a temporary extinguishing of the lights, followed by a rapid switching of the lights at low illumination, gradually returning to a circular and sequential lighting of the lamps, modulated as in (a) or (b), (d) a random pulsed lighting effect is caused to occur rather than a steady but modulated rate. This random lighting is caused by the amplified music tones picked up by the microphone. A cessation of the music causes a corresponding halting of the display movement, (e) a reversal in the direction of sequential switching of the light sources can be effected at any time in any of modes (a) through (d).

A novel feature of this invention is the capability of switching between the five described modes of display in concert with the orientation of the guitar as controlled by the various movements of the guitarist. This feature is effected by the employment of embedded mercury tilt switches in the guitar body that are associated with the electronic circuitry, and serve to switch various display modes into operation during a performance. These features may be exploited in various ways by the guitarist. Deliberate orientations of the guitar will cause certain modes to be displayed. Because of the complementary nature of the display modes, the natural and spontaneous movements of the guitarist will result in pleasing and aesthetic effects to be viewed by the audience.

In summary, a dynamically illuminated guitar is capable of being used by a guitarist to exhibit a wide variety of pleasing and exciting display modes that serve to enhance, not only the musical notes, but the dynamic movements of the guitarist.

BRIEF DESCRIPTION OF DRAWINGS

The details of the invention are described in connection with the accompanying drawings in which.

BEST MODE FOR CARRYING OUT THE INVENTION

The dynamically illuminated guitar is described in terms of the best mode (preferred embodiment) of the invention and is depicted in FIGS. 1 through 5.

Figure 1:
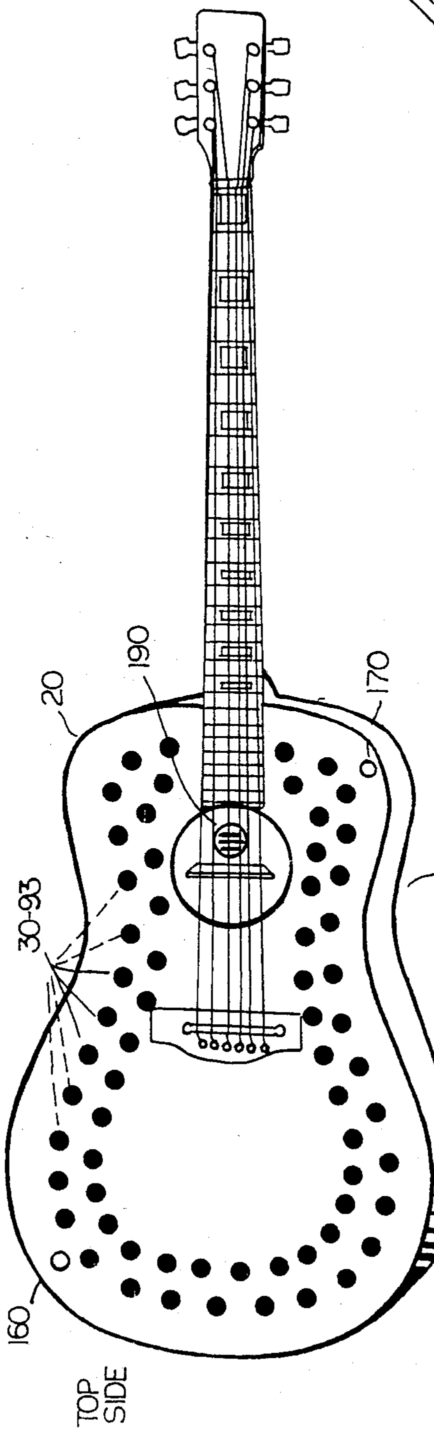
FIG. 1 is a top view of the invention illustrating locations of lights and microphone.
Figure 2:
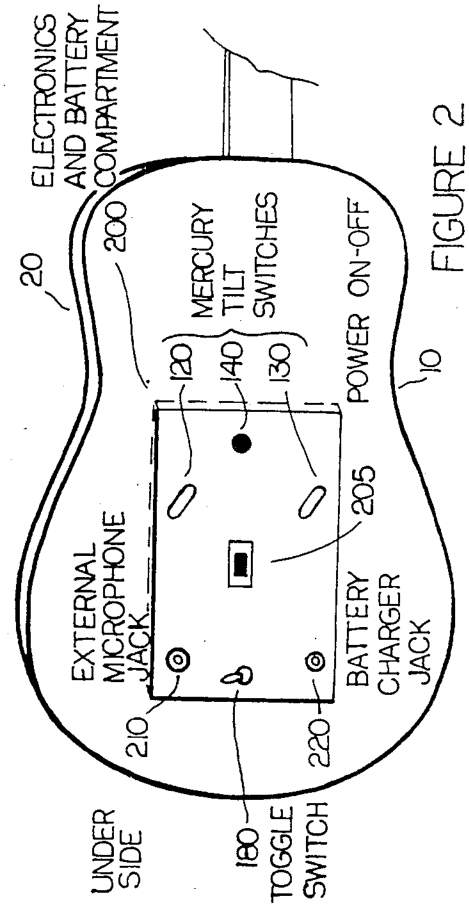
FIG. 2 is a bottom view of the invention, illustrating the location of the electronics and battery compartment, switches mounted thereon, and jacks used for an external microphone and a battery charger.

The invention is best described by referring to FIG. 1 and FIG. 2. In FIG. 1, the invention 10 comprises a conventional guitar 20 on which is mounted 64 light-emitting diodes (LEDs) 30 through 93 in a pattern on the face of the guitar 20. These LEDs are typically recessed in the face of the guitar body 20. The absolute placement of the LEDs 30–93 is not critical to the invention, but the lights are so located to provide pleasing visual accompaniment to the guitar music. Also recessed in the face of the guitar body 20 are two light-dependent resistors (LDRs) 160 and 170. The LDRs are typically part number J4-805 manufactured by G.C. Electronics located in Ill., U.S.A. Recessed in the guitar body 20 near the guitar strings is an internal microphone 190, typically an MC500 dynamic cartridge, manufactured by Philmore Manufacturing Company located in N.Y., U.S.A. or an inductive pickup microphone.

Referring to FIG. 2, an electronics and battery compartment 200 is mounted flush with the underside of the guitar body 20. The electronic, electro-optical and mechanical components within compartment 200 are typically made accessible by hingedly attaching compartment 200 to body 20. A power on-off slide switch 205 is mounted on the external surface of the compartment 200. An external microphone jack 210 and battery charger jack 220 are mounted flush on the compartment 200. Three mercury tilt switches 120, 130 and 140 are located in strategic locations and are also recessed in the face of the compartment 200. Mercury tilt switches 120 and 130 are each typically a single-pole, single-throw switch, e.g., part number 35-760, manufactured by G.C. Electronics. Switch 140 is a single-pole, double-throw switch. Also mounted on the face of the compartment 200 is a miniature single-pole, double-throw toggle switch 180.

Figure 3A:
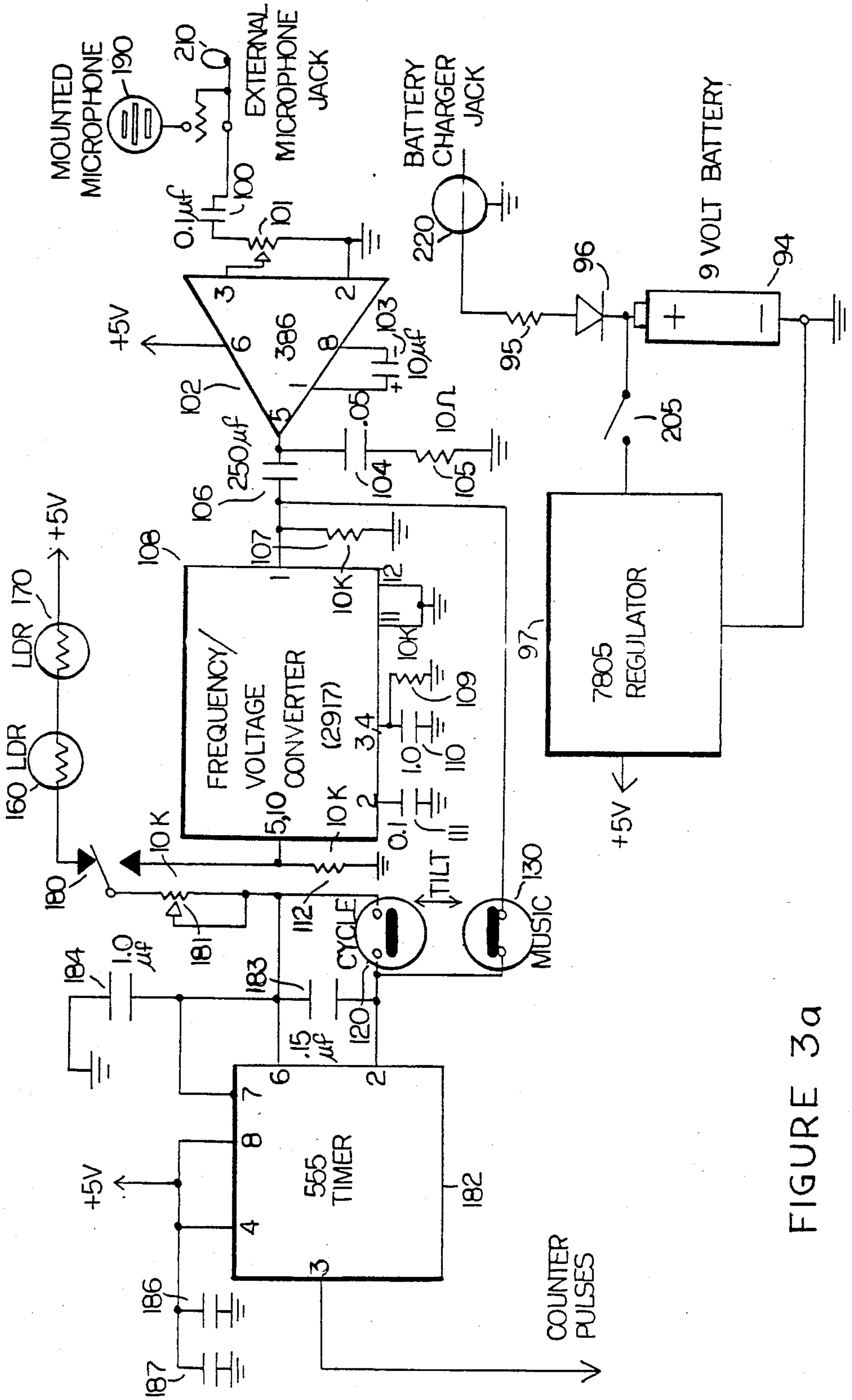
FIG. 3(*a*) and (*b*) is an electrical schematic of the electronic, mechanical and electo-optical components comprising the invention.
Figure 3B:
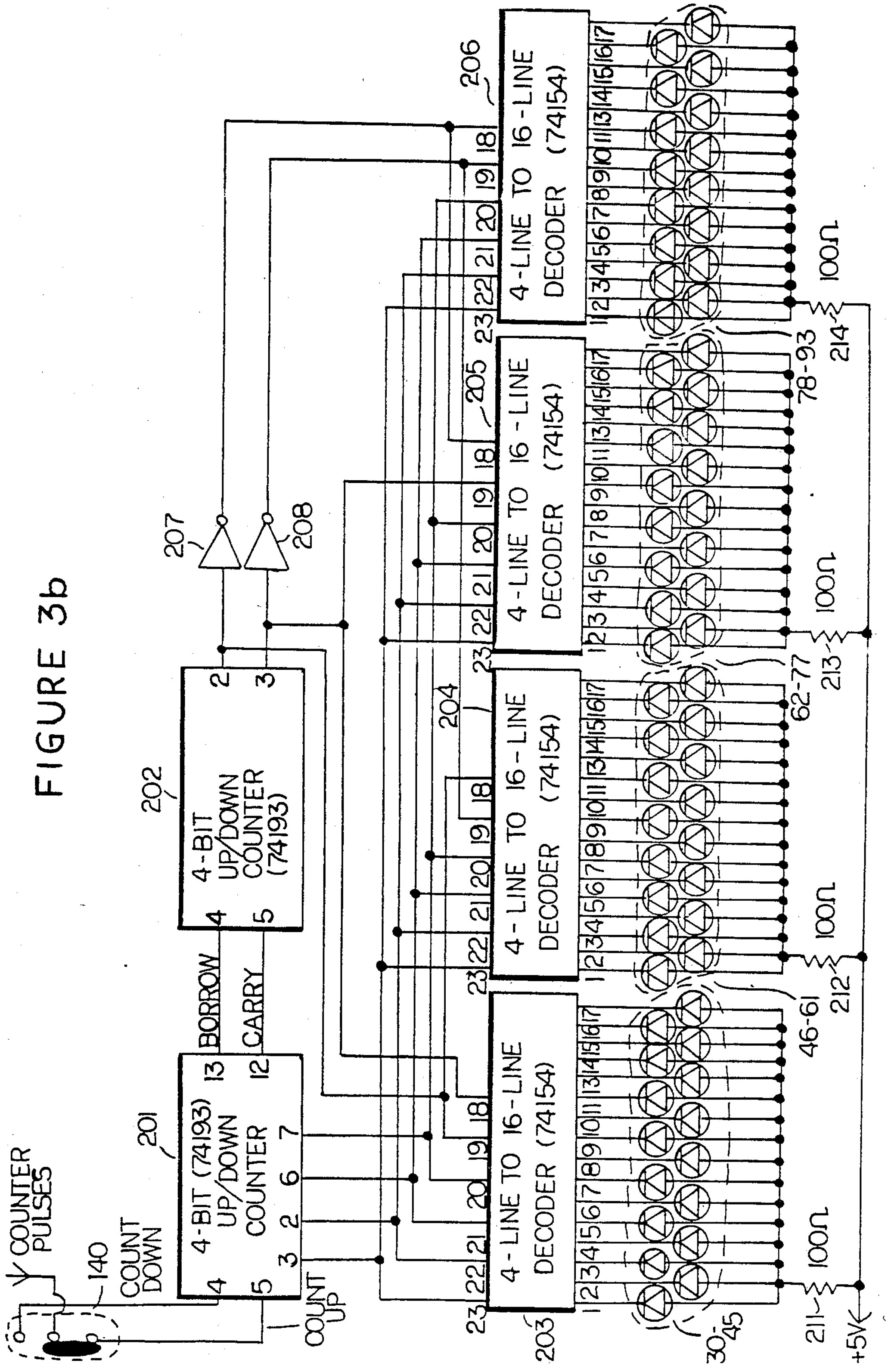

A description of the electronic, electro-optical and mechanical components on and within the compartment 200, and their interconnection with LEDs 30 through 93 mounted on the guitar body 20 can best be accomplished by referring to FIGS. 3(*a*) and (*b*).

FIG. 3(*a*) illustrates the clock-forming circuitry that causes LEDs 30–93 to be turned on in sequential order. Since there are a number of modes of operation of the invention, the effect of viewing the 64-LED display will be different with each mode.

Electric energy is provided for the circuity by a 9-volt battery 94. This battery may be either an alkaline type or a rechargeable nickel-cadmium battery. In the latter case, battery charging capability is provided through jack 220, resistor 95 and diode 96. The output DC voltage from battery 94 is connected to DC regulator 97 through power on-off switch 205. The regulator 97 is typically a 7805 regulator producing a 5-volt DC output used as a supply voltage for the circuitry to be described.

Sound produced by the guitar is picked up by microphone 190, converted to electrical energy and passed through coupling capacitor 100 and sensitivity control potentiometer 101, and amplified in amplifier 102. Provision is also made for using an external microphone input at jack 210. The application of a phono-plug into this jack 210 will disable any signal from microphone 190. Amplifier 102 is typically an LM386 audio power amplifier whose gain has been adjusted to approximately 200 in the audio range by capacitor 103. A sensitivity setting is made to potentiometer 101 such that with normal guitar music being picked up by microphone 190, the output AC voltage swing of amplifier 102 stays fairly constant at 3.5–4 volts peak-to-peak. The series connection of capacitor 104 and resistor 105 from output of amplifier 102 to ground provides a flat frequency response from below 100 Hz to 10 KHz.

The output signal from amplifier 102 is coupled through capacitor 106 to resistor 107 in parallel with the input pin 1 of frequency-voltage converter 108. The output signal is also coupled to mercury tilt switch 130. Frequency-voltage converter 108 is typically an LM2917, and is designed to produce a linear DC voltage vs. input frequency of the AC signal. By choosing resistor 109 to have a value of 10 Kohms, capacitor 111 to be 0.1 microfarad, the output voltage at pin 5 of frequency-voltage converter 108 will be +4 volts DC across resistor 112 when a 5 KHz input frequency is applied to pin 1 of device 108.

Various display modes are possible with this invention depending upon positions of mercury tilt switches 120, 130, 140 and mechanical switch 180. Switches 120 and 130 are so oriented on the guitar body 20 that when switch 120 is closed, switch 130 is open, and vice-versa. Switch 180 may be used by the guitarist to switch between the output of frequency-voltage converter 108 and the light-dependent resistance network of LDRs 160 and 170. LDRs 160 and 170 each vary in resistance in proportion to the amount of light incident on them. Under dark conditions, each LDR resistance is approximately 12 Kohms. When exposed to bright light, their resistance drops to approximately 250 ohms.

The common wiper of switch 180 is connected to one end of 10 Kohms potentiometer 181. The wiper and other end of potentiometer 181 are connected together and also connected to pins 6 and 7 of timer 182, one end of capacitor 183, one end of capacitor 184, and one end of mercury tilt switch 120. The other end of capacitor 183 and the other end of switch 120 are connected together, and also connected to the other end of mercury tilt switch 130 and to pin 2 of timer 182.

Timer 182 is typically an LM555 timer and is designed to operate in either an astable mode or a pulsed-regenerative mode. Pin 4 of timer 182 is a reset input, and is disabled by connecting it to pin 8, the 5-volt supply pin. Capacitors 186 and 187 provide by-passing of any noise or interference on the supply voltage to the ground return line. Pin 3 is the output pin of timer 182 and is normally high (logical "1"). In the astable mode, mercury tilt switch 120 is closed, switch 130 is open, and switch 180 is connected to the LDR circuit. Under these conditions, a series of negative-going pulses are produced at pin 3 of timer 182. The repetition rate of these pulses will be dependent on the product of the resistor combination of potentiometer 181, LDRs 160 and 170, and capacitor 184. Since capacitor 184 is typically 1.0 microfarad, the period is approximately 12 milliseconds when there is no light exposure on the LDRs, and 2 milliseconds when they are exposed to bright light. The time calculation also assumes that potentiometer 181 is set approximately to the center of its range. It will be obvious to one skilled in the art that by controlling the amount of light exposure to the LDRs by the dynamic movements of the guitarist or by employing a cyclically varying light source in the vicinity of the guitar, the pulse repetition period may be varied dynamically between 2 and 12 milliseconds.

If switch 180 is switched to the frequency-voltage converter 108, timer 182 will remain in an astable mode, provided an AC signal of sufficient musical pitch is present at pin 1 of device 108. Otherwise, if no sound is present, pin 5 of device 108 will remain near zero volts. In order for an astable condition to be present in timer 182, the voltage on pin 6 of timer 182 must rise to at least two-thirds of the 5-volt supply voltage. Hence, once an audio signal of sufficient pitch is present, it will cause a varying DC voltage of sufficient magnitude to produce a varying pulse repetition period at pin 3 of timer 182.

Both mercury tilt switches 120 and 130 may both be switched open to produce another visual effect. There is a range of guitar 20 orientation where neither switch 120 or 130 are closed. When switch 130 is momentarily closed, the voltage at pin 2 of timer 182 is grounded through resistor 107. This causes pulses to stop at pin 3 of timer 182. In this mode, resistor 107 will be connected to pin 2 of timer 182 and to one end of capacitor 183. Since switch 120 is open, the other end of capacitor 183 is actively connected to pin 6 of timer 182, capacitor 184 and potentiometer 181. When switch 130 is again opened, the charge on capacitor 183 temporarily holds pin 2 of timer 182 low and pin 3 of timer 182 high. However, capacitor 183 begins slowly discharging, causing the voltage at pin 2 of timer 182 to slowly rise. When this voltage has risen to greater than one-third of the supply voltage, internal conditions are such in timer 182 that pin 3 experiences high frequency oscillations resulting in a low steady illumination of LEDs 30–93. This occurs because the internal flip-flop of timer 182 is being simultaneously set and reset by voltages at pins 2 and 6. When the charge across capacitor 183 is further reduced, the timer will return to a more stable lower frequency oscillation determined by capacitor 184 and the resistance circuit through potentiometer 181. Operation will then follow very closely those conditions described for the "CYCLE" mode above, where mercury tilt switch 120 was closed, since a low or zero charge across capacitor 183 will produce results very similar to capacitor 183 being short-circuited by switch 120. This cycle will continue to repeat, being further modulated by either the LDR circuit or the frequency-voltage converter circuit, depending on the position of toggle switch 180.

As previously mentioned, timer 182 will also operate in a pulsed-regenerative mode. In this case, pulses produced at the output pin 3 of timer 182 are at a very high frequency and are produced in bursts as controlled by the audio music signal from the microphone. In this mode, mercury tilt switch 120 is open, switch 130 is closed and switch 180 is connected to either the LDR circuit or to frequency-voltage converter 108. The opening of switch 120 allows capacitor 183 to bridge from pin 2 to pins 6 and 7 of timer 182 as described previously. When no audio signal is present from pin 5 of audio amplifier 102, no pulses will be produced at the output pin of timer 182. However, when audio is present and the AC signal on pin 2 of timer 182 is swinging positive, the signal will be coupled through capacitor 183 to pins 6 and 7 of timer 182. When pin 6 voltage rises to two-thirds of the supply voltage, it resets an internal circuit of timer 182, causing a low impedance to ground at pin 7 of timer 182. Because pins 6 and 7 are tied together, their voltage is driven low. This transient voltage is coupled to pin 2 through capacitor 183, which causes the internal circuit of timer 182 to again be set, in turn causing a high impedance at pin 7. As long as the AC signal from audio amplifier 102 is on its positive swing, however, the regenerative condition will be maintained, and high frequency pulses will continue.

When the audio amplifier swings low, pin 3 of timer 182 will stay high, and no pulses will be generated, since a negative-going signal will be coupled from pin 2 to pins 6 and 7 of timer 182 through capacitor 183.

The placement of feedback capacitor 183 between pins 2 and 6 of timer 182 in both CHARGE/DISCHARGE mode (switch 130 momentarily closed, then switches 120 and 130 open) and in the MUSIC mode (switch 130 closed, switch 120 open) is thus able to produce many unusual and pleasing visual effects.

FIG. 3(*b*) illustrates a schematic of the digital circuitry that is triggered from pin 3 of timer 182, and that sequentially enables drive signals to each of the LEDs 30 through 93. Pin 3 of timer 182 is connected to the common contact of mercury tilt switch 140. Switch 140 is a single-pole, double-position mercury tilt switch whose two position contacts are connected to pins 4 and 5, respectively, of 4-bit up-down counter 201. This counter is a 74193 counter, and pulses on pin 4 produce a decreasing count. Pulses on pin 5 produce an increasing count. The counter output pins are 3, 2, 6 and 7 in increasing binary significance. "Borrow" and "Carry" outputs are also produced from counter 201. These occur on pins 13 and 12, respectively. To produce a 6-bit counter to control 64 LEDs, an additional counter chip 202 (also a 74193) is employed. The "Borrow" output pin 13 from counter 201 is used as the "count-down" clock at input pin 4 of counter 202. Similarly, the "Carry" output pin 12 from counter 201 is used as the "count-up" clock at input pin 5 of counter 202. The two least significant bits of counter 202 (pins 3 and 2) then become the most significant bits of a combined 6-bit counter (4 bits from counter 201, and 2 bits from counter 202).

Four 4-line to 16-line decoders (devices 203 through 206) are used to decode the 64 unique states of the 6-bit counter. Each of these decoders is a 74154 device and each output line drives one of 64 LEDs 30–93. Two of four select lines are used to select one of decoders 203 through 206. Signals from pins 2 and 3 of counter 202 are 2 of the select lines. These are each inverted in inverters 207 and 208, which are typically 2 of 8 devices from a 7404 TTL package. The inverter outputs are used as the remaining 2 select lines. When pins 2 and 3 are low, decoder 203 will be selected, and counter bits from pins 3, 2, 6 and 7 of counter 201 will be applied to decoder 203 and successively enable LEDs 30 through 45, which are connected to pins 1 through 11, and pins 13 through 17 of decoder 203. The anodes of LEDs 30–45 are connected together and to resistor 211. The other end of resistor 211 is connected to +5 volts DC. Similarly, resistors 212, 213 and 214 provide a current path for each remaining group of 16 LEDs, respectively. When pin 2 of counter 202 is low and inverter 208 output is low, decoder 204 will be selected. The lower 4 bits (pins 3, 2, 6 and 7 of counter 201) are applied to all four decoders. Decoder 204 enables LEDs 46 through 61. When pin 3 of counter 202 and the output of inverter 207 are both low, decoder 205 will be selected, and will enable LEDs 62 through 77. When both inverter 207 and 208 outputs are low, decoder 206 will be selected, and will enable LEDs 78 through 93.

Since there are 64 unique states to the combined counter, each of the 64 LEDs will be turned on one at a time in succession at each pulse produced at timer 182 output pin 3. When switch 140 connects to the "count-down" input, the LEDs will turn on sequentially in a clock-wise fashion. Conversely, when switch 140 is connected to the "count-up" input, the LEDs will turn on in reverse order, i.e., counter-clockwise.

Figure 4:
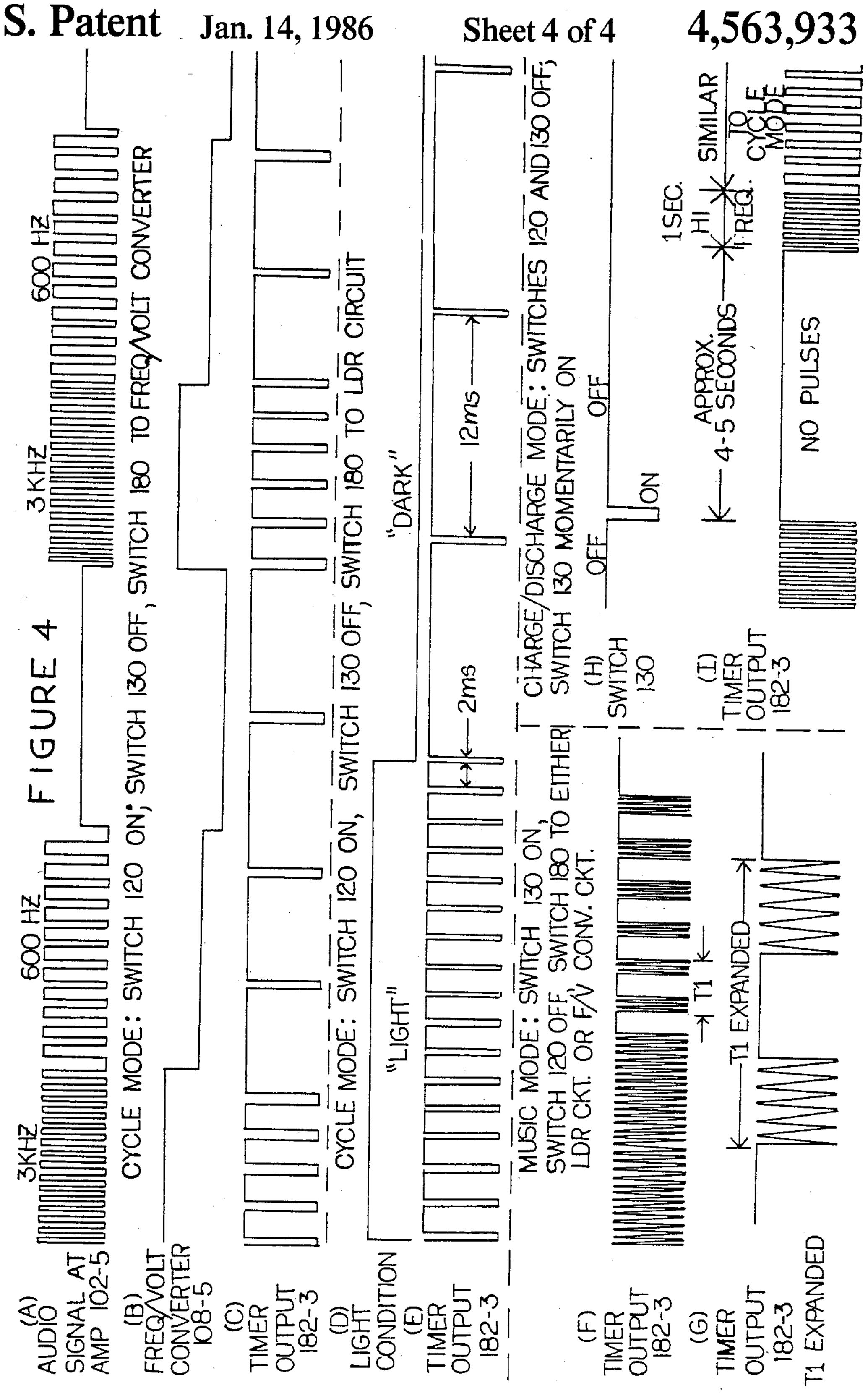
FIG. 4 illustrates pertinent timing waveforms corresponding to various display modes of the invention.

FIG. 4 illustrates typical waveforms at key points in schematic 3(*a*) for various display modes of the invention. Waveform 4(*a*) is a time-voltage waveform at the output of audio amplifier 102, pin 5. Two audio tones: a 3 KHz burst followed by a 600 Hz burst appear twice in the waveform, interrupted by a span of no signal. These are only used for illustrative purposes, since the shape of the music waveforms may take many complex forms. Because of the gain and limiting in amplifier 102, the waveforms of FIG. 4(*a*) maintain a constant peak-to-peak amplitude.

The three basic display modes that produce timer 182 pulses are the "CYCLE" or astable mode, the "CHARGE/DISCHARGE" mode, and the "MUSIC" or pulsed-regenerative mode. Waveforms 4(*b*) through (*e*) present pertinent waveforms corresponding to the "CYCLE" mode. This corresponds to the condition where mercury tilt switch 120 is closed and switch 130 is open. There are two different possible effects in the "CYCLE" mode, depending on the position of toggle switch 180. Waveforms 4(*b*) and (*c*) illustrate the effect that occurs when switch 180 is connected to frequency-voltage converter 108. Waveform 4(*b*) shows the voltage at pin 5 of device 108 in response to the audio signal in FIG. 4(*a*). It is seen that the voltage varies linearly with the frequency and returns to zero volts when the signal is absent. Waveform 4(*c*) illustrates the pulse waveform produced at timer 182 output pin 3 in response to waveform 4(*b*). It is seen that the higher the voltage from pin 5 of converter 108, the higher will be the pulse repetition rate at timer 182 output. Since each pulse produced by timer 182 will cause a different LED to light, it will be obvious that the rate that LEDs 30–93 are sequentially lit will be controlled by the audio signal caused by the guitar music.

If toggle switch 180 is connected to the LDR circuit, a different effect is produced. This is illustrated by waveforms 4(*d*) and (*e*). Waveform 4(*d*) shows two possible light exposures to LDRs 160 and 170. These conditions may be produced by cycling background lighting effects and by the guitarist's arm position as he is strumming the guitar strings. Waveform 4(*e*) shows the response of timer 182 to the varying resistance of LDRs 160 and 170. Two different pulse repetition periods are evident: a faster 2 millisecond period when the LDRs are exposed to bright light, and a slower 12 millisecond period when the LDRs are shielded from the light. It is evident that the sequencing rate of LEDs 30–93 can be controlled, not only by the sound of the music, but also by the guitarist's its hand movements while he is playing the guitar, and by the use of cycling background lighting.

A very different display effect is produced in the "MUSIC" mode, when mercury tilt switch 130 is closed, and switch 120 is open. Waveforms 4(*f*) and (*g*) illustrate this effect. Waveform 4(*f*) illustrates the effect of timer 182 output pin 3 in the "MUSIC" mode. It is seen that a much higher pulse repetition rate occurs, but only during the positive-going excursion of the audio signal. For illustrative purposes, the timer period T1 in waveform 4(*f*) has been expanded in waveform 4(*g*). The overall effect on the LEDs is very different, since the pulse repetition rate of these pulses is much higher than can be visually displayed by the LEDs. However, the counter circuitry of FIG. 3(*b*) does respond to this high repetition rate and causes the LEDs to be sequentially selected at a very fast rate The visual effect is that of lights with random flickering, only observable when the music pauses. The apparent random displacement of the lights is caused by the very fast "near invisible" sequencing.

In the "CHARGE/DISCHARGE" mode, by momentarily closing switch 130, a temporary halting of the timer pulses is effected. Waveforms 4(*h*) and (*i*) illustrate this effect. The time base of these two waveforms as illustrated is much longer than that of waveforms 4(*a*) through (*g*). Waveform 4(*h*) illustrates a momentary closing of mercury tilt switch 130. Waveform 4 (*i*) shows that pulses from pin 3 of timer 182 are halted at the moment switch 130 is closed. Approximately 4 to 5 seconds after switch 130 is again opened, pulses are resumed. At first, for approximately 1 second, the rate is extremely high and the visual effect is that of low steady illumination of all the LEDs. After this, the mode closely resembles the "CYCLE" mode waveforms of FIG. 4(*b*) through (*e*).

Figure 5:
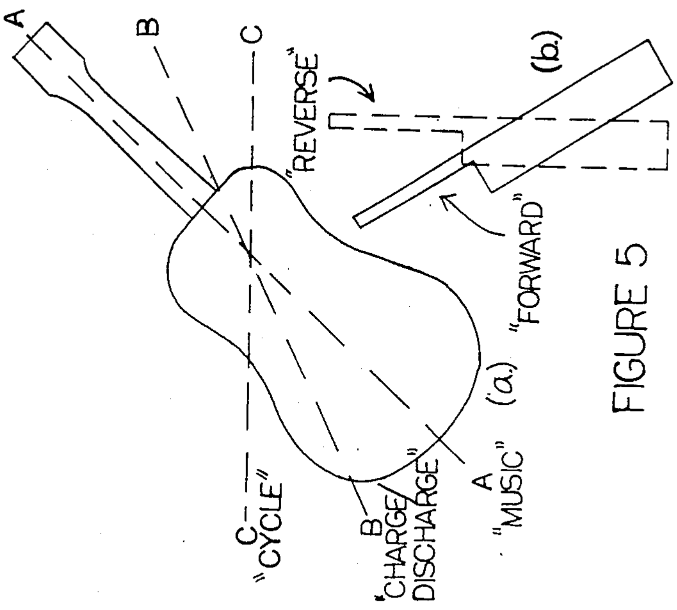
FIG. 5 illustrates the different orientations of the guitar that are associated with each visual display mode.

It should be apparent that the guitarist is able to display a variety of effects while playing the guitar. FIG. 5 illustrates the manner in which the guitarist, while using his natural playing motions, is able to switch between the "MUSIC", "CYCLE" and "CHARGE/DISCHARGE" modes, and also between a "FORWARD" and a "REVERSE" sequencing of the LEDs. In FIG. 5(*a*), the guitar is aligned along a 45 degree offset axis A—A from horizontal. Note that the face of the guitar body lies in a near-vertical plane with the face of the guitar tilted slightly upward as in FIG. 5(*b*). This is a typical natural position for playing the guitar. In this position, the "MUSIC" mercury tilt switch 130 is closed, and switch 120 is open. If it is desired to have the LED lamps cycle sequentially rather than in the pulsed-regenerative "MUSIC" mode, by tilting the guitar and aligning it along horizontal axis C—C of FIG. 5(*a*), switch 130 will open and "CYCLE" switch 120 will close. The offset angle of axis B—B is approximately 20 degrees above the horizontal axis. When the guitar is tilted upward approximately 20 degrees, both switches 120 and 130 open. By momentarily tilting the guitar still further to approximately 45 degrees upward (axis A—A), switch 130 will momentarily close. The guitar may immediately be returned to an approximate axis B—B (20 degrees) position to experience the delayed visual effects of the "CHARGE/DISCHARGE" mode.

In all of the display modes previously described, "FORWARD/REVERSE" mercury tilt switch 140 remains closed in the "FORWARD" mode as long as the face of the guitar 20 remains in a near-vertical plane. If the guitar is rotated around its longitudinal axis so that the face of the guitar is tilted more vertically, the sequential cycling direction of the LED display is reversed. In this orientation, switch 140 connects pin 3 of timer 182 to the "count-up" input of counter 201 and the display LEDs are in the "REVERSE" mode. All other modes previously described will still be displayed when the proper longitudinal axial tilt is applied. In other words, switches 120 and 130 are affected only by the longitudinal tilt, while switch 140 is affected solely by rotational tilt.

In order to achieve the proper switch closures corresponding to the various display modes, the mercury tilt switches 120, 130 and 140 are imbedded into the compartment 200 at the proper angles such that when the desired guitar tilt is applied, the mercury switch is oriented near-vertical to provide gravitational forceaiding of the mercury to achieve closure. It should be obvious to one skilled in the art that, by properly mounting the mercury tilt switches, the different display modes can be obtained by other than those guitar orientations described in FIG. 5.

In summary, the natural actions and movements of the guitarist are exploited in the invention to produce spectacular and pleasing visual lighting displays for accompaniment to the guitar music.

Although the invention has been described in complete detail and pictorally shown in the accompanying drawings it is not to be limited to such details since many changes and modifications may be made to the dyamically illuminated guitar without departing from the spirit and scope thereof. Hence the invention is described to cover any and all modifications and forms which may come within the language and scope of the appended claims.

I claim:

1. A dynamically illuminated guitar, comprising:

(a) a guitar;

(b) a plurality of lamps, embedded into or mounted on the face of said guitar;

(c) an internal microphone, mounted in the interior or on the face of said guitar;

(d) a plurality of light-dependent resistors, embedded into or mounted on the face of said guitar;

(e) a pulse-forming circuit that produces a train of digital pulses in various formats consisting of:

(1) a first format consisting of a series of pulses whose time spacing is proportional to and varied by the electric signals produced by the pitch of the musical and vocal sounds into the internal microphone, (2) a second format consisting of a series of pulses whose time spacing is proportional to and varied by electrical signals produced by the amount of light energy received by the light-dependent resistors, (3) a third format consisting of pulses produced when the sound volume into the interior microphone exceeds an upper threshold, the pulse rate being equivalent to the frequency of the sound signals, (4) a fourth format consisting of a time period of a few seconds when no pulses appear, followed by a brief burst of very high frequency pulses, further followed by a train of pulses similar to the first format, and (5) a fifth format consisting of a time period of a few seconds when no pulses appear, followed by a very brief burst of very high frequency pulses, further followed by a train of pulses similar to the second format;

(f) a first two-terminal mercury tilt switch, equivalent to an electrical single-pole, single-throw switch having open and closed positions that are determined by the physical orientation of the switch, for switching between formats of said pulse-forming circuit, the closed position allowing either of the first two formats, and the open position allowing any of the latter three formats;

(g) a second two-terminal mercury tilt switch of similar construction as said first mercury tilt switch for switching between the third, fourth and fifth formats, the closed position allowing the third format and the open position allowing either the fourth or fifth formats;

(h) a single-pole, double position electromechanical switch for switching between pulse formats of said pulse-forming circuit, the first position allowing the first pulse format to appear if the first mercury tilt switch is in the closed position and the second mercury tilt switch is in the open position, or the first position allowing the fourth pulse format to appear if both said first and second mercury tilt switches are in the open position, the second position allowing the second pulse format to appear if said first mercury tilt switch is in the closed position and said second mercury tilt switch is in the open position, or the second position allowing the fifth pulse format to appear if both said first and second mercury tilt switches are in the open position;

(i) a sequential lighting circuit capable of accepting pulses at a forward input port and lighting each of the plurality of said lamps in a fixed sequential order, each pulse causing only one lamp to be lit at a time, said sequential lighting circuit also being capable of accepting pulses at a reverse input port and lighting each of the plurality of said lamps in a fixed sequential order that is the reverse of the sequence produced by pulses at the forward input port;

(j) a three-terminal mercury tilt switch equivalent to a single-pole, double position switch whose two positions are determined by the physical orientation of the switch, the first position of the switch allowing pulses from said pulse-forming circuit to be sent to the forward input port of said sequential lighting circuit, the second position of the switch allowing pulses from said pulse-forming circuit to be sent to the reverse input port of said sequential lighting circuit;

(k) an electric battery for supplying electrical power to said pulse-forming circuit and said sequential lighting circuit;

(l) a single-pole, single-throw electromechanical switch having an open and closed position, the closed position allowing electrical power to be supplied to said pulse-forming circuit and said sequential lighting circuit, the open position preventing the power from being supplied to the circuits; and (m) an electronics and battery compartment mounted in the guitar, for housing said pulse-forming circuit, said sequential lighting circuit, said first and second two-terminal mercury tilt switches, said three-terminal mercury tilt switch, said single-pole, double position electromechanical switch, said single-pole, single-throw electromechanical switch, and said electric battery.

2. The apparatus as recited in claim 1, further comprising:

(a) a battery charger jack mounted on said electronics and battery compartment; and (b) a battery charger circuit connected between said battery charger jack and said electric battery.

3. The apparatus as recited in claim 1, further comprising an external microphone jack mounted on said electronics and battery compartment for connecting an external microphone to said pulse-forming circuit, the connection of an external microphone plug to the external microphone jack causing an interruption of the connection between said microphone and the pulse-forming circuit.

4. The apparatus as recited in claim 1, wherein said lamps are light-emitting diodes.

5. The apparatus as recited in claim 1, further comprising a sensitivity control potentiometer used to adjust the level of the electrical signal produced by the sound volume from said microphone.

6. The apparatus as recited in claim 1, further comprising a 10 K ohm potentiometer used to adjust the average time spacing of the pulse formats.

7. The apparatus as recited in claim 1 wherein said internal microphone is of the dynamic cartridge type.

8. The apparatus as recited in claim 1 wherein said internal microphone is of the inductive pick-up type.

9. The apparatus as recited in claim 1 wherein said electric battery is comprised of a rechargeable nickel-cadmium battery.

* * * * *